United States Patent
Stueber

(10) Patent No.: US 8,011,710 B2
(45) Date of Patent: Sep. 6, 2011

(54) FIXTURE ELEMENT, IN PARTICULAR FOR MOTOR VEHICLES, FOR HOLDING A RECEPTACLE

(75) Inventor: Thomas Stueber, Trebur (DE)

(73) Assignee: GM Global Technology Operations LLC, Detroit, MI (US)

( * ) Notice: Subject to any disclaimer, the term of this patent is extended or adjusted under 35 U.S.C. 154(b) by 50 days.

(21) Appl. No.: 12/487,471

(22) Filed: Jun. 18, 2009

(65) Prior Publication Data
US 2009/0315356 A1 Dec. 24, 2009

(30) Foreign Application Priority Data
Jun. 19, 2008 (DE) .......................... 10 2008 029 259

(51) Int. Cl.
*B60R 7/00* (2006.01)
(52) U.S. Cl. .................................. 296/24.34; 296/37.8
(58) Field of Classification Search ................. 296/37.8, 296/24.34
See application file for complete search history.

(56) References Cited

U.S. PATENT DOCUMENTS

| | | | |
|---|---|---|---|
| 5,779,302 A | 7/1998 | Geier et al. | |
| 6,045,173 A * | 4/2000 | Tiesler et al. | 296/37.8 |
| 6,682,116 B1 | 1/2004 | Okumura | |
| 2004/0016859 A1 | 1/2004 | Nishizawa | |
| 2004/0118860 A1 | 6/2004 | Leopold et al. | |
| 2006/0027722 A1 | 2/2006 | Hoshi | |
| 2006/0037984 A1 | 2/2006 | Misumi | |
| 2007/0000959 A1 * | 1/2007 | Perin | 224/275 |

FOREIGN PATENT DOCUMENTS

| | | |
|---|---|---|
| DE | 19616774 A1 | 11/1997 |
| DE | 602004009471 T2 | 7/2008 |
| DE | 102007061203 A1 | 6/2009 |
| EP | 1277613 A2 | 1/2003 |
| EP | 1431114 A2 | 6/2004 |
| JP | 2003048474 A | 2/2003 |

* cited by examiner

*Primary Examiner* — Joseph D Pape
(74) *Attorney, Agent, or Firm* — Ingrassia Fisher & Lorenz, P.C.

(57) ABSTRACT

A fixture element is provided, in particular for motor vehicles, with an upwardly open casing for accommodating at least one receptacle, and the casing exhibits at least one lateral clamping element. The casing incorporates at least one hinged support, which is substantially parallel and spaced apart from the floor in a first latchable setting, as well as essentially perpendicular to the floor in a second setting. The respective clamping element is further arranged above the support relative to its first setting. In such a fixture element, it is proposed that the hinged support be able to pivot around an axis mounted in the casing, and the support exhibits two support sections interconnected so that they can pivot around an axis situated parallel to the casing axis. The two support sections are toggled and folded toward each other when the support is moved from the first setting to the second setting.

9 Claims, 3 Drawing Sheets

FIXTURE ELEMENT, IN PARTICULAR FOR MOTOR VEHICLES, FOR HOLDING A RECEPTACLE

CROSS-REFERENCE TO RELATED APPLICATION

This application claims priority to German Patent Application No. 102008029259.1, filed Jun. 19, 2008, which is incorporated herein by reference in its entirety.

TECHNICAL FIELD

The invention relates to a fixture element, in particular for motor vehicles, with an upwardly open casing for accommodating at least one receptacle. The casing exhibits a floor and at least one lateral clamping element, and the casing incorporates at least one hinged support, which is parallel and spaced apart from the floor in a first latchable setting, as well as essentially perpendicular to the floor in a second setting, and the respective clamping element is further arranged above the support relative to its first setting.

BACKGROUND

A fixture element is described in German Patent Application 10 2007 061 203.8.

At least one object of the present invention is to further develop this fixture element in such a way as to enable a space-saving accommodation of the fixture in its second setting in the area of one side of the casing. In addition, other objects, desirable features, and characteristics will become apparent from the subsequent summary and detailed description, and the appended claims, taken in conjunction with the accompanying drawings and this background.

SUMMARY

The at least one object, other objects, desirable features, and characteristics, are achieved by virtue of the fact that the hinged support can be pivoted around an axis mounted in the casing, and the support exhibits two support sections interconnected so that they can pivot around an axis situated parallel to the casing axis, and the two support sections are folded toward each other when the support is moved from the first setting to the second setting. Therefore, it possible to toggle the support from its first setting to its second setting.

In the first setting of the support, two support planes are formed in the casing for the at least one receptacle. If the foldable support is in the first setting and latched, and the support is placed under the upper lower end of the opening of the casing, an area for holding the at least one receptacle is formed in the casing above the support. Another area for holding one or more additional objects is then created under the support. By contrast, if the hinged support is in its second setting, a holding area with a grater overall depth is created, thereby extending from the upper end of the opening in the casing to the floor of the casing. In this case, the casing can accommodate a larger receptacle, viewed in its extension perpendicular to the floor area of the casing.

The toggling support sections preferably fold backward into their second setting relative to the orientation of the motor vehicle. This movement of the support sections corresponds to the ergonomically convenient movement when the fixture element is situated next to the vehicle passengers oriented in the traveling direction, in particular the driver.

In particular, the pivoting hinge of the two support sections is designed in such a way that the two support sections abut each other flatly in the second setting of the section. This enables a very space-saving accommodation of the support in its second setting inside the casing.

From the standpoint of an ergonomically convenient access to the casing, and hence the at least one receptacle accommodated by the casing, it is viewed as especially advantageous if the support section pivoted in the casing is swiveled by an angle of up to about 120° in the second setting of the support relative to the position of this support section in the first setting of the support. This slightly inclined position of the support section relative to the perpendicular in its second setting makes it possible to reach into this area of the casing at a corresponding incline, making objects arranged inside the casing especially easy to get to.

The pivoting axis of the two support sections in the second setting of the support is preferably spaced a greater distance away from the floor than in the first setting of the support. Consequently, the two support sections are preferably folded up from the flat position in the first setting of the support. Hence, the support sections are situated closer to the casing opening in the second setting of the support, thereby making them especially easy to grasp when returning the support back to the first setting.

In particular to provide a structurally especially advantageous manufacturing process and minimize the plurality of parts, it is provided that the two support sections are essentially identical in design.

To enable easy and reliable grasping of the support, one advantageous embodiment provides that at least one of the support sections exhibit a recess open toward the pivoting axis of the two support sections or toward the casing. In the area where the support can be folded, or in the area of the free end of the support, it therefore becomes possible to grasp and pivot one of the support sections, whether it is from the first setting to the second setting or from the second setting to the first setting.

According to an embodiment of the invention, the at least one receptacle is held by means of the at least one lateral clamping element. In this regard, the casing exhibits an upper frame, in particular, one that can be clamped with the casing section exhibiting the floor and walls of the casing. The frame preferably exhibits the at least one lateral clamping, which in particular is elastic. If the frame can be clamped with the casing section, the frame with the clamping element can be removed from the casing section. This type of use is indicated in cases where receptacles held by the casing need not be fixed in place.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
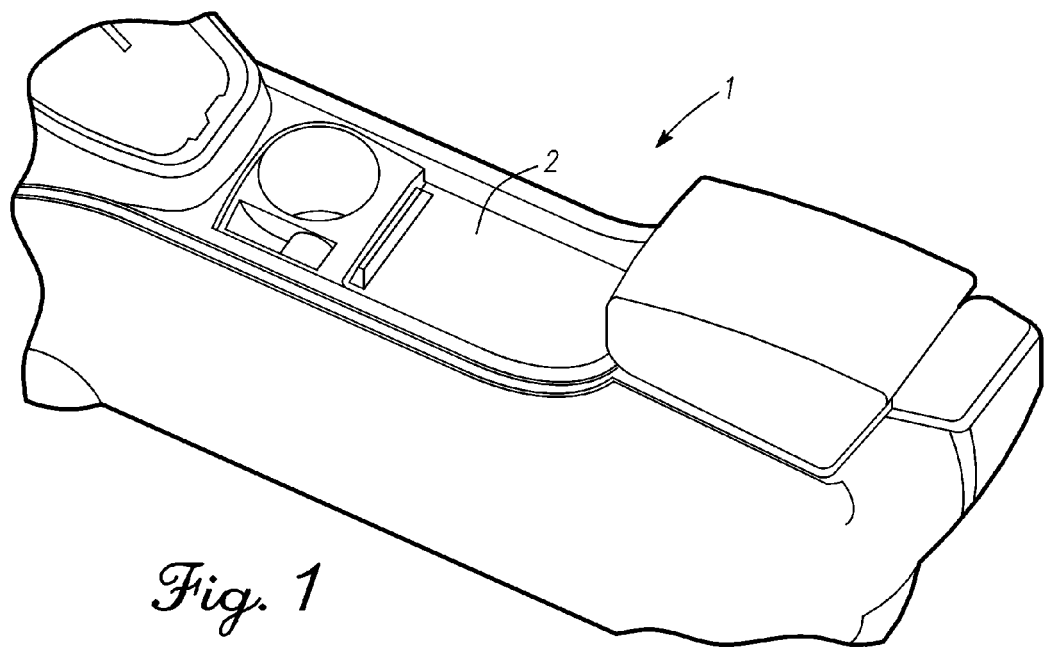
FIG. 1 is a section of a middle console of a passenger car with the casing of the fixture element is closed by means of a roller blind.
Figure 2:
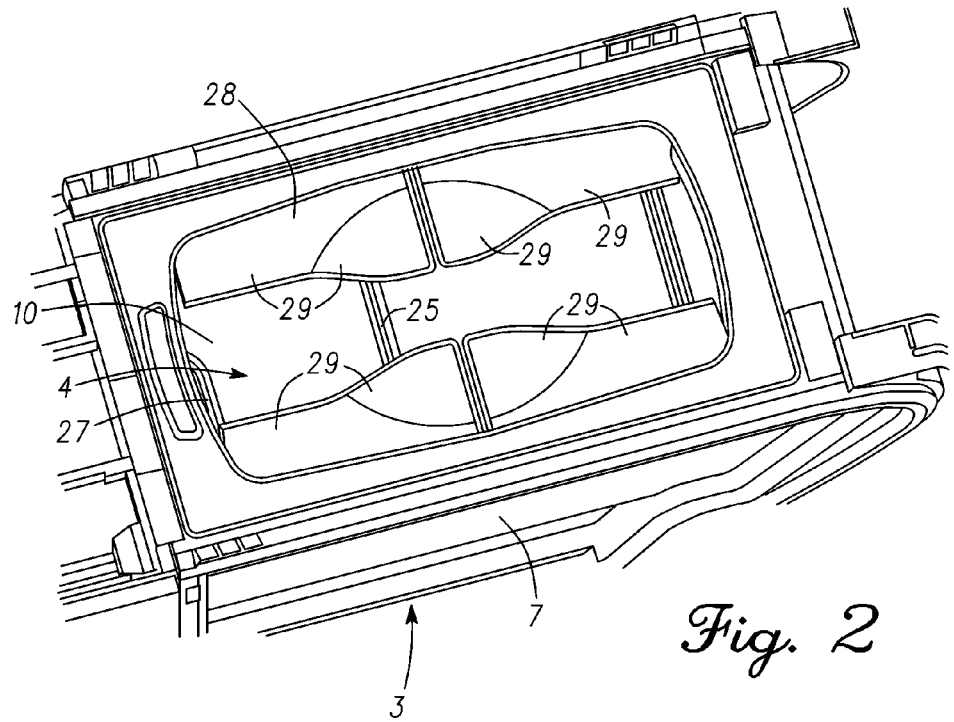
FIG. 2 is a section of the middle console according to FIG. 1, with the roller blind open and the support in the first setting, viewed from above at an incline.
Figure 3:
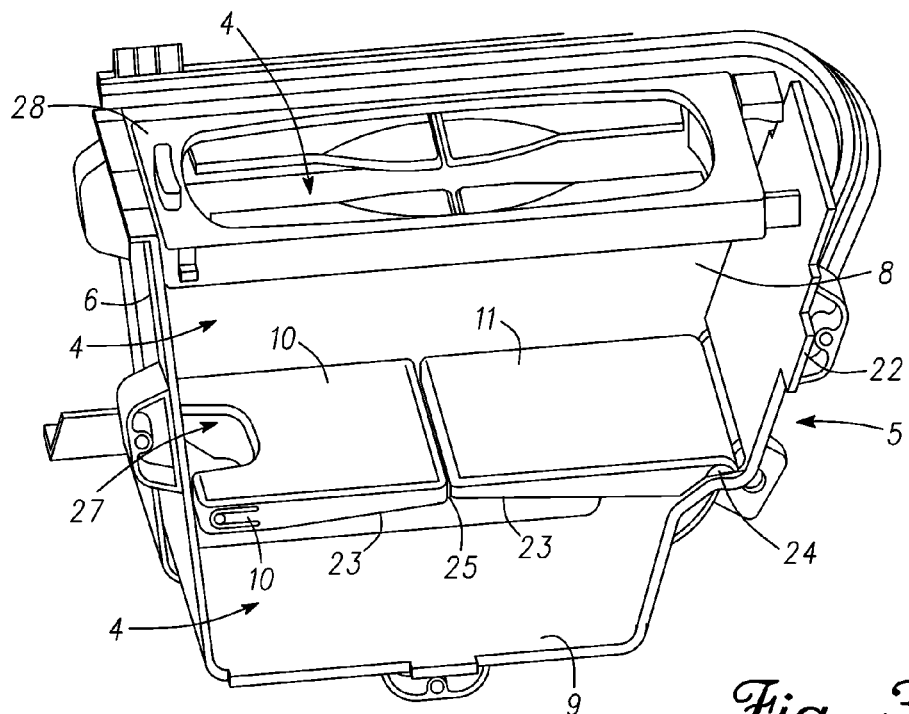
FIG. 3 is a spatial view of the section of the middle console shown on FIG. 2, viewed from the side at an incline.

Depicted is a section of a middle console 1 with a horizontally sliding roller blind 2 located above the fixture element 3 according to an embodiment of the invention mounted in the middle console 1. The roller blind 2 covers the opening 4 of the casing 5 of the fixture element 3 in the setting shown on FIG. 1; the roller blind 2 is not shown on FIG. 2 to FIG. 5.

The fixture element 3 is designed as a module, and hence can be inserted into an opening in the middle console 1 depending on how the vehicle is outfitted. The casing 5 of the fixture element 3 is box-shaped, with a front face wall 6 extending substantially perpendicular to the floor 9 of the casing, a rear face wall 22 extending at an angle of roughly 110° relative to the floor 9, and also lateral walls 7 and 8 arranged perpendicular to the front face wall 6, which connect the two face walls 6 and 22.

A hinged support 23 is arranged inside the casing 5, and here formed by two lamellar support sections 10 and 11. The support section 11 can be pivoted around an axis 24 situated in the rear lateral wall 22. This axis 24 is arranged parallel to the floor 9, and located slightly under half the height of the casing 5. The end of the support section 11 facing away from the axis 24 is pivoted with the other support section 10 by means of another axis 25. As opposed to the axis 24 arranged in the upper area of the support section 11, the pivoting axis 25 is situated between the two support sections 10 and 11 in the lower area of the support sections 10 and 11 in relation to their extended arrangement corresponding to the first setting of the support 23. In this first, horizontal setting of the support 23 arranged parallel to the floor 9, the end area of the support section 10 facing away from the axis 25 abuts a stop 26 of the front face wall 6. In this setting, the facing front surfaces of the support sections 10 and 11 come into contact above the axis 25, so that this extended setting of the support 23 represents its lower end setting.

Figure 4:
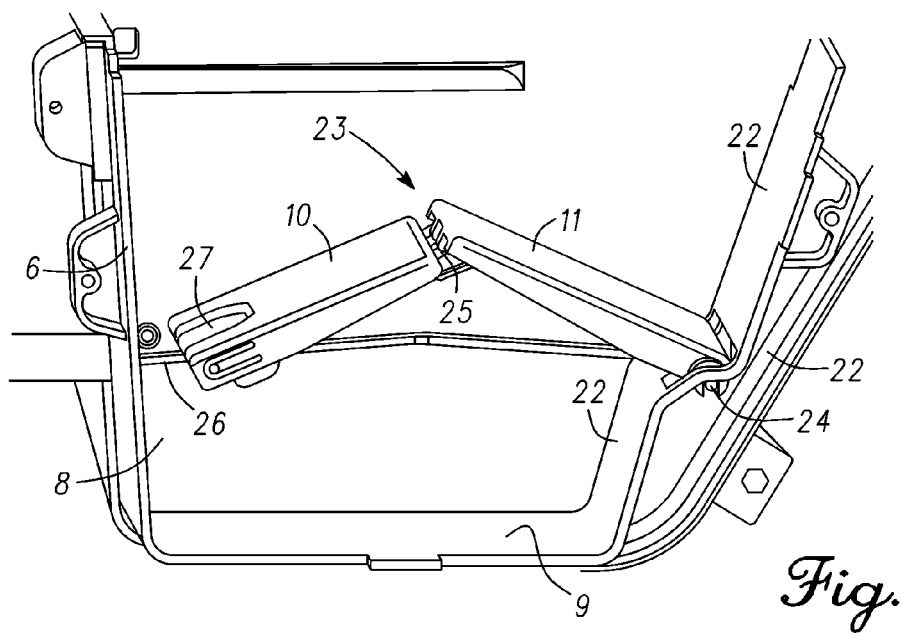
FIG. 4 is the section of the middle console shown on FIG. 3, with the support in an intermediate setting, viewed from the side at an incline.
Figure 5:
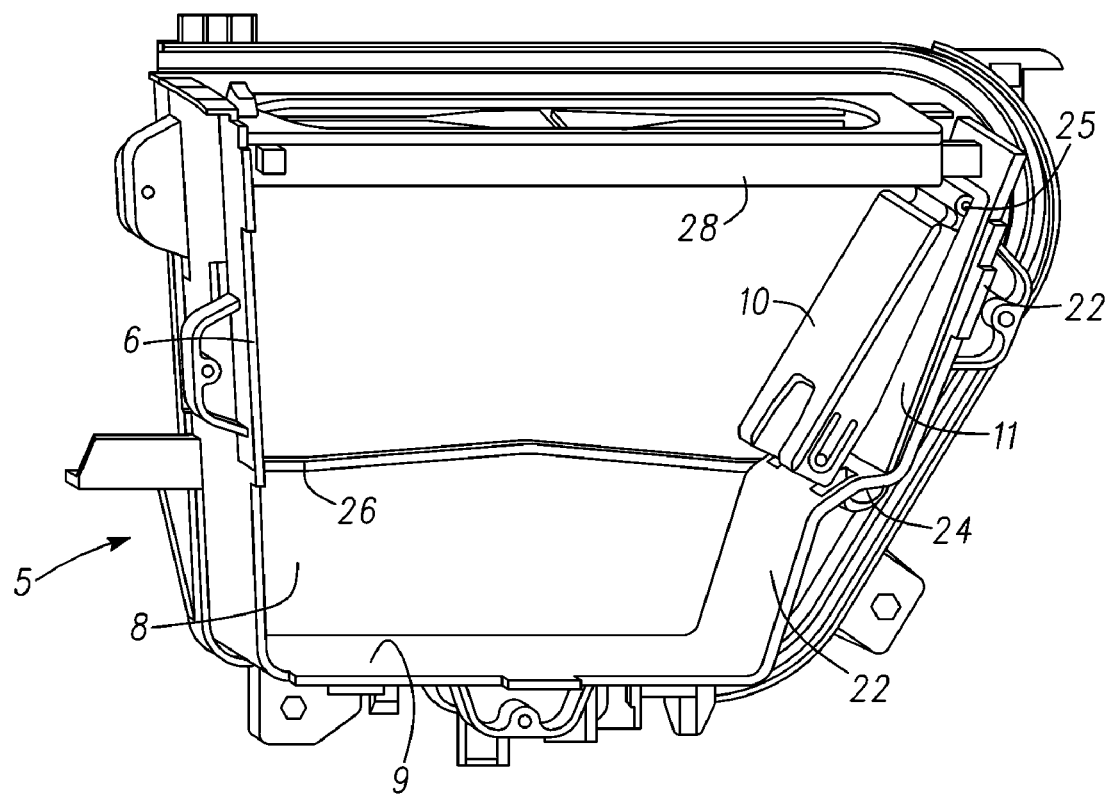
FIG. 5 is the section of the middle console shown on FIG. 3 and FIG. 4, in the completely folded setting of the support, viewed from the side at an incline.

The support 23 can be folded by toggling into the end setting also shown on FIG. 5 via the intermediate setting illustrated on FIG. 4. In this end setting corresponding to the second setting of the support 23, the support section 11 abuts the rear face wall 22, and the support section 10 is folded against the support section 11. In this second setting, the axis 25 is positioned slightly below the roller blind 2.

The support 23 can be folded especially easily if in particular the support section 10 exhibits a recess 27 open toward its free end, through which this support section 10 can be grasped and in particular moved from the first setting to the second setting of the support 23. The support 23 is moved from the second setting to the first setting either manually, or latching means are provided to fix the support 23 in its second setting, keeping the support 23 in this position pre-stressed by a spring, wherein the support 23 is moved to its first setting by force of the spring during manual release of the latching mechanism.

The casing 5 exhibits an upper frame 28, which can be clamped with the casing section that exhibits the floor 9 and walls 6, 7, 8 and 22 of the casing 5. The frame 28 accommodates several lateral clamping elements 29, which extend parallel to the floor 9, and project into the clear space of the frame 28. These clamping elements 29 are lip-shaped and elastic. As a consequence, these clamping elements 29 can reliably hold one or more receptacles in the fixture element 3.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A fixture element for a motor vehicle, comprising:
   a receptacle;
   an upwardly open casing adapted to accommodate the receptacle, the upwardly open casing comprising a floor and a lateral clamping element; and
   a hinged support in the upwardly open casing, which is substantially parallel and spaced apart from the floor in a first setting and substantially perpendicular to the floor in a second setting,
   wherein the lateral clamping element is further arranged above the hinged support relative to the first setting,
   wherein the hinged support is pivotable around a first axis and is mounted in the upwardly open casing,
   wherein the hinged support comprises at least two support sections interconnected to pivot around a second axis situated substantially parallel to the first axis,
   wherein the at least two support sections are folded toward each other when the hinged support is moved from the first setting to the second setting.

2. The fixture element according to claim 1, wherein the at least two support sections are adapted to abut each other flatly in the second setting of the hinged support.

3. The fixture element according to claim 1, wherein the hinged support is adapted to swivel by an angle of up to about 120° between the second setting of the hinged support and the first setting of the hinged support.

4. The fixture element according to claim 1, wherein the second axis of the at least two support sections in the second setting of the hinged support is spaced a greater distance away from the floor than in the first setting of the hinged support.

5. The fixture element according to claim 1, wherein the at least two support sections are substantially identical in design except for one of the at least two support sections is pivotably mounted in the upwardly open casing.

6. The fixture element according to claim 1, wherein the upwardly open casing comprises a face wall and the hinged support is folded against the face wall in the second setting.

7. The fixture element according to claim 1, wherein the hinged support is latched in the second setting against a force applied by a spring.

8. The fixture element according to claim 1, wherein at least one of the support sections exhibits a recess that extends toward a front face wall of the casing.

9. The fixture element according to claim 1, wherein the upwardly open casing comprises an upper frame that can be clamped with a casing section comprising the floor, a face wall, and lateral walls of the upwardly open casing.

* * * * *